E. DOUD.
Corn Sheller.
No. 84,173.
Patented Nov. 17, 1868.
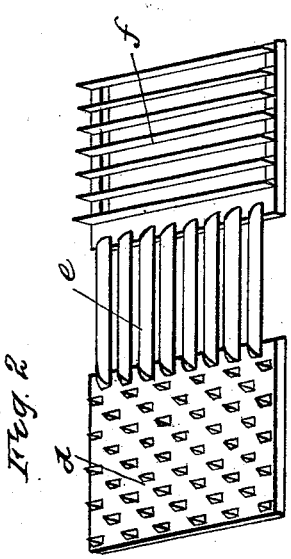
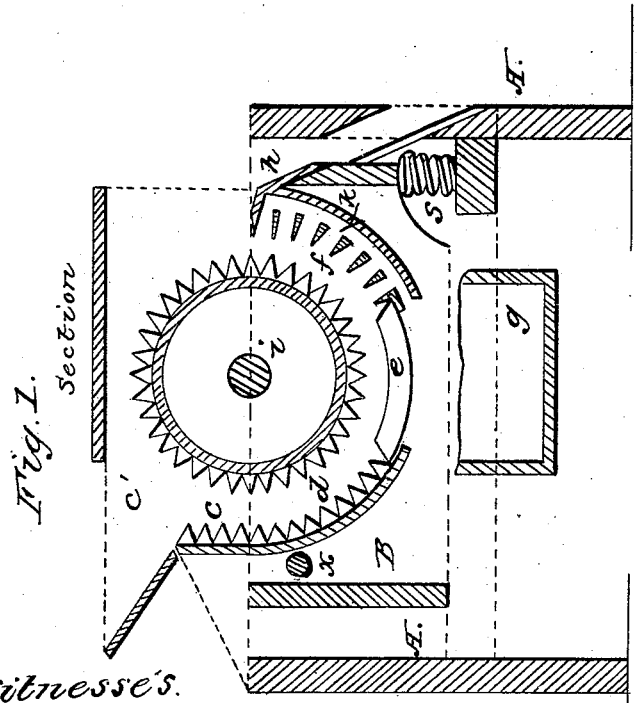

ELIHU DOUD, OF OSHKOSH, WISCONSIN.

Letters Patent No. 84,173, dated November 17, 1868.

IMPROVEMENT IN CORN-SHELLERS.

The Schedule referred to in these Letters Patent and making part of the same.

*To all whom it may concern:*

Be it known that I, ELIHU DOUD, of the city of Oshkosh, county of Winnebago, and State of Wisconsin, have invented a new and useful Improvement in Corn-Shellers; and I do hereby declare the following is a full, clear, and exact description of the construction and operation of the same, reference being had to the annexed drawings, making a part of this specification, in which—

Figure 1 is a vertical longitudinal section.

Figure 2 is a perspective view of the outer cylinder or shell, $d\ e\ f$, fig. 1, as it would appear flattened out.

A A is a rectangular frame, with sides and ends enclosed.

B is also a rectangular frame, with sides and ends enclosed, and located inside of the frame A A, and hinged to the sides thereof by a rod running horizontally through both A A and B at $x$, the opposite end of the frame B resting on the spring S, and free to move in the direction of the spring.

Inside the frame B, and attached to the sides thereof, is a half cylindrical shell, constructed in three sections, seen in $d$, $e$, and $f$. The section $d$ is a segment, constructed with teeth, arranged in horizontal rows. The section $e$ is a segment, constructed with open grates running in the longitudinal direction of the machine. The section $f$ is a segment, constructed with open grates running crosswise. The three segments, when united, form an outer shell, of a half circular form.

C is an extension of the toothed segment in a perpendicular direction.

$i$ is a toothed roller, with teeth arranged parallel to its axis.

C' is a hopper and cover.

$h$ is an incline, that receives the cobs.

$k$ is an outer passage, for fragments of corn shelled on the segment $f$.

$g$ is a delivery of the corn shelled.

I will now proceed to describe the operation of my invention. The corn in cob is placed in the hopper C', and received in a horizontal position between the toothed plate C and the toothed roller $i$. The toothed roller $i$ is revolved either in the use of a crank, by hand, or in the use of a pulley, friction-wheel, or cog-wheel, with power applied.

As the roller $i$ revolves, the corn is brought between the toothed roller and the toothed segment $d$, and the corn nearly or quite all stripped from the cob. The teeth on both cylinder and roller being arranged horizontally, the cob is retained in a horizontal position, and thus carried over the segment $e$; and on the passage of the cob over the horizontal cross-bars $f$, the cob is stripped of any corn there may be remaining thereon, and is then thrown out over the segment $f$, and discharged over the incline $h$.

The segment $e$ is composed of longitudinal open bars, and the corn shelled on the segment $d$ escapes through the same into the discharge-conductor $g$. The corn shelled on the open cross-bar segment $f$ is received in the conductor $k$, and emptied into the discharge-conductor $g$.

The spring S allows the outer cylinder, $d\ e\ f$, to accommodate itself to the different-sized ears as they come in contact between the outer shell and the toothed roller $i$.

The toothed plate C, being really a continuation of the hopper to the cylinder and roller, may be either wholly or partially of a plane surface, at option.

I disclaim the toothed roller $i$, the plate C, the hopper C', and the spring S, when in and of themselves considered; but What I do claim as my invention, and desire to secure by Letters Patent, is—

An outer half cylindrical shell, constructed in segments, $d\ e\ f$, in the manner described, when used in combination with the toothed roller $i$, spring S, plate C, and hopper C', as and for the purposes described.

ELIHU DOUD.

Witnesses:
W. G. RITCH,
GEO. W. BURNELL.